(12) United States Patent
Bonorden et al.

(10) Patent No.: US 6,541,050 B1
(45) Date of Patent: Apr. 1, 2003

(54) SALT FLAVOR ENHANCING COMPOSITIONS, FOOD PRODUCTS INCLUDING SUCH COMPOSITIONS, AND METHODS FOR PREPARING SUCH PRODUCTS

(75) Inventors: William R. Bonorden, Moorestown, NJ (US); Denise A. Giordano, Jackson, NJ (US); Beverly L. Lee, Marlton, NJ (US)

(73) Assignee: Campbell Soup Company, Camden, NJ (US)

( * ) Notice: Subject to any disclaimer, the term of this patent is extended or adjusted under 35 U.S.C. 154(b) by 0 days.

(21) Appl. No.: 09/203,288

(22) Filed: Dec. 1, 1998

(51) Int. Cl.[7] .......................... A23L 1/237; A23L 1/304
(52) U.S. Cl. ........................ 426/74; 426/648; 426/649; 426/806
(58) Field of Search ................. 426/649, 648, 426/74, 806

(56) References Cited

U.S. PATENT DOCUMENTS

| | | | |
|---|---|---|---|
| 1,874,055 A | 8/1932 | Liebrecht | |
| 1,998,179 A | 4/1935 | Wolf | |
| 2,299,999 A | 10/1942 | Lipman, Jr. | |
| 2,471,144 A | 5/1949 | Davy | |
| 2,824,008 A | 2/1958 | Perry | |
| 2,829,056 A | 4/1958 | Kemmerer | |
| 3,505,082 A | 4/1970 | Miller | 426/648 |
| 3,514,296 A | 5/1970 | Frank et al. | |
| RE27,981 E | 4/1974 | Frank et al. | |
| 4,107,346 A | 8/1978 | Kravitz | 426/648 |
| 4,243,691 A | 1/1981 | Mohlenkamp, Jr. et al. | 426/649 |
| 4,471,002 A | 9/1984 | Buckholz, Jr. et al. | 426/582 |
| 4,473,595 A * | 9/1984 | Rood et al. | 426/649 |
| 4,917,913 A | 4/1990 | Buckholz, Jr. et al. | 426/536 |
| 4,931,305 A | 6/1990 | Karppanen et al. | 426/649 |
| 4,963,387 A * | 10/1990 | Nakagawa et al. | 426/649 |
| 4,988,527 A | 1/1991 | Buckholz, Jr. et al. | 426/536 |
| 5,034,378 A | 7/1991 | Cox | 514/23 |
| 5,064,663 A | 11/1991 | Murray et al. | 426/649 |
| 5,098,724 A | 3/1992 | DuBois et al. | 426/96 |
| 5,213,838 A * | 5/1993 | Sheikh | 426/649 |
| 5,562,942 A | 10/1996 | Koh et al. | 426/649 |
| 5,562,943 A | 10/1996 | Koh et al. | 426/649 |
| 5,626,904 A | 5/1997 | Frederiksen | 426/649 |
| 5,631,038 A * | 5/1997 | Kurtz et al. | 426/649 |
| 5,871,803 A * | 2/1999 | Bonorden et al. | 426/649 |
| 6,136,349 A * | 10/2000 | Karppanen et al. | 426/648 |

FOREIGN PATENT DOCUMENTS

| | | | |
|---|---|---|---|
| EP | 059363 | * | 9/1982 |
| EP | 0190521 | | 8/1988 |
| EP | 0297763 | | 1/1989 |
| EP | 0636321 | | 2/1995 |
| EP | 0441786 | | 10/1995 |
| FR | 2493681 | | 5/1982 |
| GB | 2015863 | | 9/1979 |
| GB | 2237720 | | 5/1991 |
| WO | 8500958 | | 3/1985 |
| WO | 9318668 | | 9/1993 |
| WO | 9828989 | | 7/1998 |
| WO | 9828990 | | 7/1998 |

* cited by examiner

Primary Examiner—Arthur L. Corbin
(74) Attorney, Agent, or Firm—Baker Botts L.L.P.

(57) ABSTRACT

A salt flavor enhancing composition includes a combination of sodium chloride and potassium chloride in a range of about 74 to about 99 percent by weight and a sulfate-containing salt or salts or a combination of a sulfate-containing salt or salts and a chloride-containing salt or salts in a range of about 1 to about 26 percent by weight. Further, the sulfate-containing salts may be potassium sulfate, calcium sulfate, or combinations thereof. In addition, the chloride-containing salts may be calcium chloride, magnesium chloride, or combinations thereof. A salt flavor enhancing composition also may be adapted for use on food products having high intrinsic sodium content. The composition may include potassium chloride in a range of about 75 to about 95 percent by weight and a sulfate-containing salt or salts or a combination of a sulfate-containing salt or salts and a chloride-containing salt or salts in a range of about 5 to about 25 percent by weight. Again, the sulfate-containing salt or salts may be potassium sulfate, calcium sulfate, and combinations thereof. These compositions may be added to food products to achieve desired salt taste and desired ion concentrations.

75 Claims, No Drawings

SALT FLAVOR ENHANCING COMPOSITIONS, FOOD PRODUCTS INCLUDING SUCH COMPOSITIONS, AND METHODS FOR PREPARING SUCH PRODUCTS

This application claims priority from U.S. patent application Ser. Nos. 09/200,740 (now abandoned) and 60/110,168. This application is related to U.S. patent application Ser. No. 08/865,964, now issued as U.S. Pat. No. 5,871,803.

BACKGROUND OF THE INVENTION

1. Field of the Invention

The present invention relates to salt flavor enhancing compositions and methods for manufacturing such compositions. In particular, it relates to salt flavor enhancing compositions, which include sodium chloride (NaCl), i.e., table salt or salt, in combination with potassium chloride, and calcium or potassium sulfate, or both, such that the total amount of sodium may be reduced without significant reduction in salt flavor. The salt flavor enhancing compositions may also contain calcium chloride or magnesium chloride, or both. Further, it relates to salt flavor enhancing compositions, which include potassium chloride and at least a calcium salt and an additional potassium salt, that may be added to products having intrinsic sodium levels or targeted sodium levels.

2. Description of Related Art

Salt or table salt, as those terms are generally used, is added to processed and cooked foods to provide palatability and a desirable salty taste. Chemically, salt comprises about 60 percent elemental chlorine and about 40 percent elemental sodium. Sodium, an essential nutrient, plays a vital role in maintaining concentration and volume of extracellular fluid.

From a dietary perspective, the blood pressure of any individual may respond differently to various levels of sodium. Family history of blood pressure, weight, age, amount of regular physical activity, alcohol intake, and overall dietary factors, such as dietary intake of calcium, potassium, sodium and fiber, may play a role in affecting blood pressure. Some scientific evidence suggests that a more balanced dietary intake of sodium, potassium, magnesium, and other cations may beneficially affect blood pressure. Individuals whose blood pressure increases when sodium intake is high or decreases when sodium intake is low are called "salt sensitive." For such salt sensitive individuals, a reduction in total dietary sodium intake may be warranted. This may be accomplished through the use of low and reduced sodium compositions and food products.

To aid in reducing dietary sodium intake, several low salt or salt substitute products have been introduced into market. Such products may include up to about 50 percent by weight of sodium chloride with the remainder replaced by potassium chloride and a magnesium salt, organic acid, amino acid, or a combination thereof. However, potassium has been found to add a bitter aftertaste to food products which many consumers find unacceptable. Further, these salt substitutes are generally formulated for direct application to foods and in cooking in the same manner by which individuals might use table salt.

In order to reduce the amount of sodium, compositions have been formulated in which sodium has been partly or wholly replaced by other substances, which imitate the taste of the salt. For the purpose of reducing the salt consumption and sodium intake, while maintaining a proper degree of salty taste, potassium chloride and ammonium chloride have been used as a partial replacements for salt. Nevertheless, as noted above, potassium chloride may generate a particularly bitter and metallic taste, and when added to foods, it may severely spoil and impair their tastes. A variety of countermeasures have been proposed to eliminate the bitterness caused by the addition of potassium chloride; for example, calcium chloride or magnesium chloride have been added to some low sodium, salt compositions, such as those described in Japanese Patent Publication No. 15299/1985. However, these measures have not produced satisfactory results, especially in processed food products. Ammonium chloride also produces a bitter aftertaste and, at cooking and baking temperatures, ammonium chloride may decompose thereby changing the pH value, taste, and other properties of food containing it. The addition of small amounts of magnesium, calcium, formates, and citrates in salt substitute compositions consisting primarily of potassium chloride has been proposed to mask or overcome the bitter taste of the potassium. However, these additives may cause the loss of the true salty flavor or the taste sensation associated with salt, and such additives may become unbalanced or negatively affect the taste of prepared or processed food products.

Thus, replacing sodium chloride by other chemical compounds may involve several disadvantages. Further, additives which mask or overcome the undesirable taste, e.g., the bitter or metallic tastes, of common salt substitutes containing potassium, may also affect the food products taste and palatability. Further, there are relatively few approved food additives which may accomplish this role.

SUMMARY OF THE INVENTION

Therefore, a need has arisen for a salt flavor enhancing composition providing a pure, balanced, and non-bitter salt flavor, with a reduced sodium content.

Accordingly, it is a technical advantage of this invention to provide salt flavor enhancing compositions comprising sodium chloride in an amount effective to promote a salty taste; potassium chloride in an amount effective to reduce the sodium content of the composition while enhancing the salty taste; and sulfate-containing salts, in particular, potassium and calcium sulfate. In addition, such compositions may include chloride-containing salts, in particular, calcium chloride and magnesium chloride, in amounts effective to mask or overcome the bitter and metallic taste of the potassium and to further enhance the salty taste.

It is a further technical advantage of the present invention to provide salt flavor enhancing compositions which may be used topically and in the preparation of beverages and food products, e.g., soups and vegetable juices, consisting essentially of sodium chloride, potassium chloride, and sulfate-containing salts, in particular potassium and or calcium sulfate. In addition, such compositions may include chloride-containing salts, in particular, calcium chloride or magnesium chloride, or both, in a constituent ratio combination, such that the resulting composition retains the balanced salty taste associated with sodium chloride and does not take on bitter or metallic aftertaste associated with known salt substitute compositions containing potassium chloride.

It is still another technical advantage of this invention to provide salt flavor enhancing compositions that include predetermined concentrations of sodium, chloride, potassium, sulfate, calcium, and magnesium ions. Moreover, it is an technical advantage of this invention to produce food products for delivering these relative ion concentrations to consumers.

In an embodiment of the invention, a salt flavor enhancing compositions may comprise a combination of sodium chloride (NaCl) and potassium chloride (KCl) in a weight percentage in a range of about 74 to about 99 percent and at least one salt comprising at least one sulfate-containing salt, in particular, potassium sulfate ($K_2SO_4$) or calcium sulfate (e.g., $CaSO_4.2H_2O$), or both, in a weight percentage of about 1 to about 26 percent. In addition, the at least one salt may further comprise at least one chloride-containing salt, in particular, calcium chloride (e.g., $CaCl_2.2H_2O$) or magnesium chloride (e.g., $MgCl_2.6H_2O$), or both, such that the combination of the at least one sulfate-containing salt and the at least one chloride-containing salt is in a range of about 1 to about 26 percent by weight percentage. In view of the detailed description and examples which follow, it will be understood by persons of ordinary skill in the art that both anhydrous and hydrated forms of these salts may be used in this invention.

In a further embodiment of the invention, a food product comprises a combination of sodium, chloride, potassium, calcium, magnesium and sulfate ions in concentration ranges and ratios, such that the food product delivers the salt flavor enhancing composition described above.

In still another embodiment of the invention, a salt flavor enhancing composition is adapted for use in a food product containing a high intrinsic sodium chloride content, such that, for example, the intrinsic sodium chloride content prevents obtaining the desired ion ratios with the salt flavor enhancing compositions described above. This composition may comprise a combination of potassium chloride in a range of about 75 to about 95 percent by weight and of at least one salt comprising at least one sulfate-containing salt, in particular, potassium sulfate or calcium sulfate, or both, in a range of about 5 to about 25 percent by weight, and which delivers the component concentrations of the salt flavor enhancing compositions described above. In addition, the at least one salt may further comprise at least one chloride-containing salt, in particular, calcium chloride or magnesium chloride, or both, such that the combination of the at least one sulfate-containing salt and the at least one chloride-containing salts is in a range of about 5 to about 25 percent by weight.

In yet a further embodiment of the invention, a method of preparing a food product including a plurality of components may comprise the steps of measuring a first concentration of sodium ions in components of the food product before adding the salt flavor enhancing composition to the food product and then adding a quantity of the composition to at least one of said plurality of components, such that the food product comprises the desired ratios of sodium, chloride, potassium, sulfate calcium, and magnesium described in the following detailed descriptions of preferred embodiments.

In still a further embodiment, the invention is a method for preparing a food product using the composition described above, which may comprise the following steps. First, an initial sodium ion concentration in a food product may be measured. Second, a quantity of the composition described above may be added to the food product, such that the food product comprises desired concentrations of potassium ions, chloride ions, and sulfate ions. Specifically, the sulfate ions in this embodiment may be provided by at least one sulfate-containing salt, which is selected from the group consisting of potassium sulfate, calcium sulfate, and combinations thereof. Third, a source of sodium ions may be added to the food product, such that the food product comprises a final sodium ion concentration in a range of about 64 to about 144 millimoles per liter of sodium ions.

Other technical advantages and features of this invention will be apparent to persons skilled in the art in view of the following detailed description.

DETAILED DESCRIPTION OF PREFERRED EMBODIMENTS

The invention is a salt flavor enhancing composition comprising a combination of sodium chloride (NaCl) and potassium chloride (KCl) in a weight percentage in a range of about 74 to about 99 percent, and sulfate-containing salts, in particular, potassium sulfate ($K_2SO_4$) or calcium sulfate (e.g., $CaSO_4.2H_2O$), or both, in a weight percentage of about 1 to about 26 percent. In addition, such compositions may include a chloride-containing salt such as calcium chloride (e.g., $CaCl_2.2H_2O$) or magnesium chloride (e.g., $MgCl_2.6H_2O$), or both, such that the sulfate and chloride-containing salts are in a weight percentage range of about 1 to about 26 percent. Hydrous or anhydrous forms of the salts cited may be used to prepare the composition, except that constituent weight percentages are changed accordingly to deliver equivalent molar ratios of sodium, potassium, chloride, magnesium, calcium, and sulfate ions as cited in examples describing embodiments of this invention.

I. FIRST COMPOSITION GROUP

The salt flavor enhancing compositions may be added to food products, such as vegetable juices, soups, and sauces, to enhance the perceived salt and content flavor of the food product and to produce food products with a reduced sodium content. A first group of compositions according to this invention comprises various combinations including potassium chloride and potassium sulfate.

In a first preferred embodiment of this group of compositions, the combined weight percentage of NaCl and KCl is in a range of about 96 to about 99 percent and the $K_2SO_4$ weight percentage is in a range of about 1 to about 4 percent. For example, this preferred embodiment of the composition may comprise the following components:

TABLE IA

| Element | % range (by weight) |
| --- | --- |
| NaCl | 45 to 83 |
| KCl | 16 to 51 |
| $K_2SO_4$ | 1 to 4 |
| Total | 100 |

In another preferred embodiment, the invention consists of a food product containing concentrations of sodium, potassium, chloride, and sulfate ions that would be obtained by adding the composition described in Table IA to a food product. For example, in this preferred embodiment of the invention, a food product would contain a range of about 64 to about 144 millimoles (mM) per liter of sodium ions, a range of about 10 to about 136 mM per liter of potassium ions, a range of about 74 to about 272 mM per liter of chloride ions, and a range of about 0.2 to about 4.0 mM per liter of sulfate ions. Thus, the ratio of sodium ions to chloride ions is from about 0.2:1 to about 1.9:1; the ratio of sodium ions to potassium ions is from about 0.5:1 to about 14.4:1; and the ratio of sodium ions to sulfate ions is from about 16:1 to about 720:1. The sulfate ions in this embodiment may be provided by at least one sulfate-containing salt, which is selected from the group consisting of potassium sulfate, calcium sulfate, and combinations thereof.

In a second preferred embodiment of this group of compositions, a combined NaCl and KCl weight percentage is about 97 to about 99 percent, and a potassium sulfate ($K_2SO_4$) weight percent is about 1 to about 3 percent. For example, this more preferred embodiment of the composition may comprise the following components:

TABLE IB

| Element | % range (by weight) |
|---|---|
| NaCl | 52 to 64 |
| KCl | 35 to 45 |
| $K_2SO_4$ | 1 to 3 |
| Total | 100 |

In another preferred embodiment, the invention consists of food products, such as soups, sauces, stews and vegetable-based drinks, containing concentrations of sodium, potassium, chloride, and sulfate ions that would be obtained by adding the composition described in Table 1B to a food product. For example, in this preferred embodiment of the invention, a food product would contain concentrations in a range of about 64 to about 144 millimoles (mM) per liter of sodium ions, in a range of about 28 to about 103 mM per liter of potassium ions, in a range of about 92 to about 242 mM per liter of chloride ions, and in a range of about 0.3 to about 3.0 mM per liter of sulfate ions. Thus, the ratio of sodium ions to chloride ions is from about 0.3:1 to about 1.6:1; the ratio of sodium ions to potassium ions is from about 0.6:1 to about 5.1:1; and the ratio of sodium ions to sulfate ions is from about 21.3:1 to about 480:1. The sulfate ions in this embodiment also may be provided by at least one sulfate-containing salt, which is selected from the group consisting of potassium sulfate, calcium sulfate, and combinations thereof.

In a third preferred embodiment of this group of compositions, suitable for topical food applications in the form of a dry mixture, a combined NaCl and KCl weight percentage is about 97 percent, and a potassium sulfate ($K_2SO_4$) weight percentage is about 3 percent. For example, in this preferred embodiment, the composition may comprise the following components:

TABLE IC

| Element | Weight % |
|---|---|
| NaCl | 57.7 |
| KCl | 40.0 |
| $K_2SO_4$ | 2.3 |
| Total | 100.0 |

In a fourth preferred embodiment of this group of compositions which is adapted for use in food products which already contain a naturally, intrinsic sodium content approaching a targeted sodium level, the composition may comprise about 94.6 percent by weight of potassium chloride and about 5.4 percent by weight of potassium sulfate. This two element form of the composition allows the application of the salt flavor enhancing composition to food products that already contain sodium concentrations approaching the formulation sodium targets described above. For example, in this preferred embodiment, the composition may comprise the following components:

TABLE ID

| Element | Weight % |
|---|---|
| KCl | 94.6 |
| $K_2SO_4$ | 5.4 |
| | 100.0 |

A method for preparing a food product using the composition described in Table ID may comprise the following steps. First, an initial sodium ion concentration in a food product may be measured. Second, a quantity of the composition described in Table ID may be added to the food product, such that the food product comprises ion concentrations in a range of about 10 to about 136 millimoles per liter of potassium ions, in a range of about 74 to about 272 millimoles per liter of chloride ions, and in a range of about 0.2 to about 4 millimoles per liter of sulfate ions. Third, a source of sodium ions may be added to the food product, such that the food product comprises a final sodium ion concentration in a range of about 64 to about 144 millimoles per liter of sodium ions.

II. SECOND COMPOSITION GROUP

A second group of compositions according to this invention comprises various combinations including sodium chloride, potassium chloride, magnesium chloride, and potassium sulfate.

In a first preferred embodiment of this group of compositions, a combined sodium chloride and potassium chloride weight percentage is in a range of about 87 to about 97 percent, a magnesium chloride (e.g., $MgCl_2 \cdot 6H_2O$) weight percentage is in a range of about 2 to about 8 percent, and a potassium sulfate weight percentage is in a range of about 1 to about 5 percent. For example, in this preferred embodiment, the composition may comprise the following components:

TABLE IIA

| Element | % range (by weight) |
|---|---|
| NaCl | 37 to 81 |
| KCl | 16 to 50 |
| $MgCl_2 \cdot 6H_2O$ | 2 to 8 |
| $K_2SO_4$ | 1 to 5 |
| Total | 100 |

In another preferred embodiment, the invention may comprise a food product containing concentrations of sodium, potassium, chloride, magnesium, and sulfate ions that would be obtained by adding the composition described in Table IIA to a food product. For example, in this preferred embodiment of the invention, a food product contain concentrations in a range of about 64 to about 144 millimoles (mM) per liter of sodium ions, in a range of about 10 to about 165 mM per liter of potassium ions, in a range of about 74 to about 314 mM per liter of chloride ions, in a range of about 0.4 to about 9.0 mM per liter of magnesium ions, and in a range of about 0.2 to about 6.3 mM per liter of sulfate ions. Thus, the ratio of sodium ions to chloride ions is from about 0.2:1 to about 2:1; the ratio of sodium ions to potassium ions is from about 0.4:1 to about 14.4:1; the ratio of sodium ions to magnesium ions is from about 7.1:1 to about 360:1; and the ratio of sodium ions to sulfate ions is from about 10.2:1 to about 720:1. The sulfate ions in this embodiment may be provided by at least one sulfate-containing salt, which is selected from the group consisting of potassium sulfate, calcium sulfate, and combinations thereof.

In a second preferred embodiment of this group of compositions, NaCl and KCl weight percentage is in a range of about 91 to about 96 percent, a magnesium chloride (e.g., $MgCl_2·6H_2O$) weight percentage is in the range of about 3 to about 6 percent, and a potassium sulfate weight percentage is in a range of about 1 to about 3 percent. For example, this preferred embodiment of the composition may comprise the following components:

TABLE IIB

| Element | % range (by weight) |
|---|---|
| NaCl | 46 to 61 |
| KCl | 35 to 45 |
| $MgCl_2·6H_2O$ | 3 to 6 |
| $K_2SO_4$ | 1 to 3 |
| Total | 100 |

In another preferred embodiment, the invention comprises a food product containing concentrations of sodium, potassium, chloride, magnesium, and sulfate ions that would be obtained by adding the composition described in Table IIB to a food product. For example, in this preferred embodiment of the invention, a food product may comprise concentrations in a range of about 64 to about 144 millimoles (mM) per liter of sodium ions, in a range of about 29 to about 117 mM per liter of potassium ions, in a range of about 95 to about 265 mM per liter of chloride ions, in a range of about 0.9 to about 5.4 mM of liter of magnesium ions, and in a range of about 0.6 to about 3.0 mM per liter of sulfate ions. Thus, the ratio of sodium ions to chloride ions is from about 0.2:1 to about 1.5:1; the ratio of sodium ions to potassium ions is from about 0.6:1 to about 5:1; the ratio of sodium ions to magnesium ions is from about 11.9:1 to about 160:1; and the ratio of sodium ions to sulfate ions is from about 21.3:1 to about 240:1. The sulfate ions in this embodiment also may be provided by at least one sulfate-containing salt, which is selected from the group consisting of potassium sulfate, calcium sulfate, and combinations thereof.

In a third another preferred embodiment of this group of compositions, which is adapted for topical food applications in the form of a dry mixture, a combined NaCl and KCl weight percentage is about 93.5 percent, a magnesium chloride (e.g., $MgCl_2·6H_2O$) weight percentage is about 4.3 percent, and a potassium sulfate weight percentage is about 2.2 percent. For example, in this preferred embodiment, the composition may comprise the following components:

TABLE IIC

| Element | Weight % |
|---|---|
| NaCl | 54.5 |
| KCl | 39.0 |
| $MgCl_2·6H_2O$ | 4.3 |
| $K_2SO_4$ | 2.2 |
| Total | 100.0 |

In a fourth preferred embodiment of this group of compositions, which is adapted for food products which already contain a high, intrinsic sodium content approaching the targeted sodium content described above, the composition may consist of about 86 percent by weight of potassium chloride, about 9 percent by weight of magnesium chloride (e.g., $MgCl_2·6H_2O$), and about 5 percent by weight of potassium sulfate. This three component form of the composition allows the application of the salt flavor enhancing composition to food products that already contain sodium concentrations approaching the desired sodium targets. For example, in this preferred embodiment, the composition may comprise the following components:

TABLE IID

| Element | Weight % |
|---|---|
| KCl | 86 |
| $MgCl_2·6H_2O$ | 9 |
| $K_2SO_4$ | 5 |
| Total | 100 |

A method for preparing a food product using the composition described in Table IID may comprise the following steps. First, an initial sodium ion concentration in a food product may be measured. Second, a quantity of the composition described in Table IID may be added to the food product, such that the food product comprises ion concentrations in a range of about 10 to about 165 millimoles per liter of potassium ions, in a range of about 74 to about 314 millimoles per liter of chloride ions, in a range of about 0.4 to about 9.0 mM per liter of magnesium ions, and in a range of about 0.2 to about 6.3 millimoles per liter of sulfate ions. Third, a source of sodium ions may be added to the food product, such that the food product comprises a final sodium ion concentration in a range of about 64 to about 144 millimoles per liter of sodium ions.

III. THIRD COMPOSITION GROUP

A third group of compositions according to this invention comprises various combinations including potassium chloride and calcium sulfate. In a first preferred embodiment of this group of compositions, a combined NaCl and KCl weight percentage is in a range of about 94 to about 99 percent and a calcium sulfate (e.g., $CaSO_4·6H_2O$) weight percentage is in a range of about 1 to about 6 percent. For example, this preferred embodiment of the composition may comprise the following components:

TABLE IIIA

| Element | % range (by weight) |
|---|---|
| NaCl | 44 to 83 |
| KCl | 16 to 50 |
| $CaSO_4·6H_2O$ | 1 to 6 |
| Total | 100 |

In another preferred embodiment, the invention consists of a food product containing concentrations of sodium, potassium, chloride, calcium, and sulfate ions that would be obtained by adding the composition described in Table IIIA to a food product. For example, in this preferred embodiment of the invention a food product comprises concentrations in a range of about 64 to about 144 millimoles (mM) per liter of sodium ions, in a range of about 9 to about 128 mM per liter of potassium ions, in a range of about 74 to 272 mM per liter of chloride ions, in a range of about 0.2 to about 6.4 mM per liter calcium ions, and a range of about 0.2 to about 6.4 mM per liter of sulfate ions. Thus, the ratio of sodium ions to chloride ions is from about 0.2:1 to about 2:1; the ratio of sodium ions to potassium ions is from about 0.5:1 to about 16:1; the ratio of sodium ions to calcium ions is from about 10:1 to about 720:1; and the ratio of sodium ions to sulfate ions is from about 10:1 to about 720:1. Calcium ion concentrations may exceed the stated range in foods containing significant intrinsic calcium or in calcium fortified food products.

In a second preferred embodiment of this group of compositions, a combined NaCl and KCl weight percentage is about 96 to about 98 percent and a calcium sulfate (e.g., $CaSO_4.2H_2O$) weight percentage is about 2 to about 4 percent. For example, in this more preferred embodiment, the composition may comprise the following components:

TABLE IIIB

| Element | % range (by weight) |
|---|---|
| NaCl | 51 to 63 |
| KCl | 35 to 45 |
| $CaSO_4 \cdot 2H_2O$ | 2 to 4 |
| Total | 100 |

In another preferred embodiment, the invention comprises a food product containing ratios of sodium, potassium, chloride, calcium and sulfate ions that would be obtained by adding the composition described in Table IIIB to a food product. For example, in this preferred embodiment of the invention, a food product comprises concentrations in a range of about 64 to 144 millimoles (mM) per liter of sodium ions, in a range of about 28 to 100 mM per liter of potassium ions, in a range of about 92 to about 244 mM per liter chloride ions, in a range of about 0.6 to about 4.0 mM per liter of calcium ions, and in a range of about 0.6 to about 4.0 mM per liter of sulfate ions. Thus, the ratio of sodium ions to chloride ions is from about 0.3:1 to about 1.6:1; the ratio of sodium ions to potassium ions is from about 0.6:1 to about 5.1:1; the ratio of sodium ions to calcium ions is from about 16:1 to about 240:1; and the ratio of sodium ions to sulfate ions is from about 16:1 to about 240:1. Calcium ions concentrations may exceed the stated range in foods containing significant intrinsic calcium or in calcium fortified food products.

In a third preferred embodiment of this group of compositions, which is adapted for use in topical food applications in the form of a dry mixture, a combined NaCl and KCl weight percentage is about 96.5 percent and a calcium sulfate (e.g., $CaSO_4 \cdot 2H_2O$) weight percentage is about 3.5 percent. For example, in this preferred embodiment, the composition may comprise the following components:

TABLE IIIC

| Element | Weight % |
|---|---|
| NaCl | 56.0 |
| KCl | 40.5 |
| $CaSO_4 \cdot 2H_2O$ | 3.5 |
| Total | 100.0 |

In a fourth preferred embodiment of this group of compositions, which is adapted for use in food products which already contain a high, intrinsic sodium content approaching a targeted level, the composition may consist of about 92 percent by weight KCl and about 8 percent by weight of calcium sulfate (e.g., $CaSO_4.2H_2O$). This two component form of the composition allows the application of the salt flavor enhancing composition to food products that already contain sodium concentrations approaching formulation sodium targets. For example, this preferred embodiment, the composition may comprise the following components:

TABLE IIID

| Element | Weight % |
|---|---|
| KCL | 92 |
| $CaSO_4 \cdot 2H_2O$ | 8 |
| Total | 100 |

A method for preparing a food product using the composition described in Table IIID may comprise the following steps. First, an initial sodium ion concentration in a food product may be measured. Second, a quantity of the composition described in Table IIID may be added to the food product, such that the food product comprises ion concentrations in a range of about 9 to about 128 millimoles per liter of potassium ions, in a range of about 74 to about 272 millimoles per liter of chloride ions, in a range of about 0.2 to about 6.4 millimoles per liter of calcium ions, and in a range of about 0.2 to about 6.4 millimoles per liter of sulfate ions. Third, a source of sodium ions may be added to the food product, such that the food product comprises a final sodium ion concentration in a range of about 64 to about 144 millimoles per liter of sodium ions.

IV. FOURTH COMPOSITION GROUP

A fourth group of compositions according to this invention comprises various combinations including potassium chloride, calcium sulfate, and potassium sulfate. In a first preferred embodiment of this group of composition, a combined NaCl and KCl weight percentage is in a range of about 90 to about 98 percent, a calcium sulfate (e.g., $CaSO_4.2H_2O$) weight percentage is in the range of about 1 to about 5 percent, and a potassium sulfate weight percentage is in a range of about 1 to about 5 percent. For example, in this preferred embodiment, the composition may comprise the following components:

TABLE IVA

| Element | % range (by weight) |
|---|---|
| NaCl | 40 to 82 |
| KCl | 16 to 50 |
| $CaSO_4 \cdot 2H_2O$ | 1 to 5 |
| $K_2SO_4$ | 1 to 5 |
| Total | 100 |

In another preferred embodiment of the invention, a food product comprises concentrations of sodium, potassium, chloride, calcium, and sulfate ions that would be obtained by adding the composition described in Table IVA to a food product. For example, in this preferred embodiment of the invention, a food product would contain a range of about 64 to about 144 millimoles (mM) per liter of sodium ions, a range of about 10 to about 153 mM per liter of potassium ions, a range of about 74 to about 285 mM per liter of chloride ions, a range of about 0.2 to about 6.0 mM per liter of calcium ions and a range of about 0.5 to about 12.0 mM per liter of sulfate ions. Thus, the ratio of sodium ions to chloride ions is from about 0.2:1 to about 2:1; the ratio of sodium ions to potassium ions is from about 0.4:1 to about 14.4:1; the ratio of sodium ions to calcium ions is from about 10.77:1 to about 720:1; and the ratio of sodium ions to sulfate ions is from about 5.3:1 to about 288:1. Calcium ion concentrations may exceed the stated range in foods containing significant intrinsic calcium or in calcium fortified food products.

In a second preferred embodiment of this group of compositions, a combined NaCl and KCl weight percentage is in a range of about 94 to about 98 percent, a calcium sulfate (e.g., $CaSO_4.2H_2O$) weight percentage is in the range of about 1 to about 3 percent, and a potassium sulfate weight percentage is in a range of about 1 to about 3 percent. For example, in this preferred embodiment, the composition may comprise the following components:

TABLE IVB

| Element | % range (by weight) |
|---|---|
| NaCl | 49 to 63 |
| KCl | 35 to 45 |
| $CaSO_4·2H_2O$ | 1 to 3 |
| $K_2SO_4$ | 1 to 3 |
| Total | 100 |

In another preferred embodiment of the invention, a food product comprises concentrations of sodium, potassium, chloride, calcium, and sulfate ions that would be obtained by adding the composition described in Table IVB to a food product. For example, in this preferred embodiment of the invention, a food product comprises concentrations in a range of about 64 to about 144 millimoles (mM) per liter of sodium ions, a range of about 28 to about 110 mM per liter of potassium ions, in a range of about 92 to about 248 mM per liter of chloride ions, a range of about 0.3 to about 2.9 mM per liter of calcium ions, and in a range of about 0.6 to about 6.0 mM per liter of sulfate ions. Thus, the ratio of sodium ions to chloride ions is from about 0.3:1 to about 1.6:1; the ratio of sodium ions to potassium ions is from about 0.6:1 to about 5.1:1; the ratio of sodium ions to calcium ions is from about 22.1:1 to about 480:1; and the ratio of sodium ions to sulfate ions is from about 10.7:1 to about 240:1. Calcium ion concentrations may exceed the stated range in foods containing significant intrinsic calcium or in calcium fortified food products.

In a third preferred embodiment of this group of compositions, which is adapted for use in topical food applications in the form of a dry mixture, a combined NaCl and KCl weight percentage is about 96 percent, a calcium sulfate (e.g., $CaSO_4.2H_2O$) weight percentage is about 2 percent, and a potassium sulfate weight percentage is about 2 percent. For example, in this more preferred embodiment, the composition may comprise the following components:

TABLE IVC

| Element | Weight % |
|---|---|
| NaCl | 58 |
| KCl | 38 |
| $CaSO_4.2H_2O$ | 2 |
| $K_2SO_4$ | 2 |
| Total | 100 |

In a fourth preferred embodiment of this group of compositions, which is adapted for use in food products which already contain a high, intrinsic sodium content approaching a targeted level, the composition may comprise about 90 percent by weight KCl, about 5 percent by weight calcium sulfate (e.g., $CaSO_4.2H_2O$), and about 5 percent by weight potassium sulfate. This three component form of the composition allows the application of the salt flavor enhancing composition to food products that already contain sodium concentrations approaching the desired sodium targets. For example, in this preferred embodiment, the composition may comprise the following components:

TABLE IVD

| Element | Weight % |
|---|---|
| KCl | 90 |
| $CaSO_4.2H_2O$ | 5 |
| $K_2SO_4$ | 5 |
| Total | 100 |

A method for preparing a food product using the composition described in Table IVD may comprise the following steps. First, an initial sodium ion concentration in a food product may be measured. Second, a quantity of the composition described in Table IVD may be added to the food product, such that the food product comprises ion concentrations in a range of about 10 to about 153 millimoles per liter of potassium ions, in a range of about 74 to about 285 millimoles per liter of chloride ions, in a range of about 0.2 to about 6 millimoles per liter of calcium ions, and in a range of about 0.5 to about 12 millimoles per liter of sulfate ions. Third, a source of sodium ions may be added to the food product, such that the food product comprises a final sodium ion concentration in a range of about 64 to about 144 millimoles per liter of sodium ions.

V. FIFTH COMPOSITION GROUP

A fifth group of compositions according to this invention comprises various combinations including potassium chloride, calcium chloride, magnesium, calcium sulfate, and potassium sulfate. In a first preferred embodiment of this group of compositions, a combined NaCl and KCl weight percentage is in a range of about 74 to about 95 percent, a calcium chloride (e.g., $CaCl_2.2H_2O$) weight percentage is in the range of about 1 to about 4 percent, a magnesium chloride ($MgCl_2.6H2O0$) weight percentage is in the range of about 1 to about 8 percent, a calcium sulfate (e.g., $CaSO_4.2H_2O$) weight percentage is in the range of about 2 to about 8 percent, and a potassium sulfate weight percentage is in a range of about 1 to about 6 percent. For example, in this preferred embodiment, the composition may comprise the following components:

TABLE VA

| Element | % range (by weight) |
|---|---|
| NaCl | 24 to 79 |
| KCl | 16 to 50 |
| $CaCl_2.2H_2O$ | 1 to 4 |
| $MgCl_2.6H_2O$ | 1 to 8 |
| $CaSO_4.2H_2O$ | 2 to 8 |
| $K_2SO_4$ | 1 to 6 |
| Total | 100 |

In another preferred embodiment in the invention, a food product comprises concentrations of sodium, potassium, chloride, magnesium, calcium, and sulfate ions that would be obtained by adding the composition described in Table VA to a food product. For example, in this preferred embodiment of the invention, a food product comprises concentrations in a range of about 64 to about 144 millimoles (mM) per liter of sodium ions, in a range of about 11 to about 258 mM per liter of potassium ions, in a range of about 76 to 426 mM per liter of chloride ions, in a range of about 0.23 to about 14 mM per liter of magnesium ions, in a range of about 0.85 to about 25 mM per liter of calcium ions, and in a range of about 0.78 to about 27 mM per liter of sulfate ion. Thus, the ratio of sodium ions to chloride ions is from about 0.2:1 to about 1.9:1; the ratio of sodium ions to potassium ions is from about 0.3:1 to about 13.1:1; the ratio of sodium ions to magnesium ions is from about 5.6:1 to about 626:1; the ratio of sodium ions to calcium ions is from about 2.6:1 to about 169:1; and the ratio of sodium ions to sulfate ions is from about 2.4:1 to about 185:1

In a second preferred embodiment of this group of compositions, a combined NaCl and KCl weight percentage is in a range of about 81 to about 92 percent, a calcium chloride (e,g., $CaCl_2.2H_2O$) weight percentage is in the range of about 1 to about 3 percent, a magnesium chloride (e.g., $MgCl_2.6H_2O$) weight percentage is in the range of about 3 to about 6 percent, a calcium sulfate (e.g., $CaSO_4.2H_2O$) weight percentage is in the range of about 3 to about 6 percent, and a potassium sulfate weight percentage is in a range of about 1 to about 4 percent. For example, in this preferred embodiment, the composition may comprise the following components:

TABLE VB

| Element | % range (by weight) |
|---|---|
| NaCl | 41 to 62 |
| KCl | 30 to 40 |
| $CaCl_2.2H_2O$ | 1 to 3 |
| $MgCl_2.6H_2O$ | 3 to 6 |
| $CaSO_4.2H_2O$ | 3 to 6 |
| $K_2SO_4$ | 1 to 4 |
| Total | 100 |

In another preferred embodiment of the invention, a food product comprises concentrations of sodium, potassium, chloride, magnesium, calcium, and sulfate ions that would be obtained by adding the composition described in Table VB to a food product. For example, in this preferred embodiment of the invention, a food product comprises concentrations in a range of about 64 to about 144 millimoles (mM) per liter of sodium ions, in a range of about 25 to about 199 mM per liter of potassium ions, in a range of about 91 to about 275 mM per liter chloride ions, in a range of about 0.8 about to 6.0 mM per liter of magnesium ions, in a range of about 1.4 to about 11.0 mM per liter of calcium ions, and in a range of about 1.3 to about 11.4 mM per liter of sulfate ions. Thus, the ratio of sodium ions to chloride ions is from about 0.2:1 to about 1.6:1; the ratio of sodium ions to potassium ions is from about 0.3:1 to about 5.8:1; the ratio of sodium ions to magnesium ions is from about 10.7:1 to about 180:1; the ratio of sodium ions to calcium ions is from about 5.8:1 to about 102.9:1; and the ratio of sodium ions to sulfate ions is from about 5.6:1 to about 110.8:1. Calcium ion concentrations may exceed the stated range in foods containing significant intrinsic calcium or in calcium fortified food products.

In a third preferred embodiment of this group of compositions, a combined NaCl and KCl weight percentage is about 87.5 percent, a calcium chloride (e.g., $CaCl_2.2H_2O$) weight percentage is about 3.5 percent, a magnesium chloride (e.g., $MgCl_2.6H_2O$) weight percentage is about 4 percent, a calcium sulfate (e.g., $CaSO_4.2H_2O$) weight percentage is about 2 percent, and a potassium sulfate weight percentage is about 3 percent. For example, in this preferred embodiment, the composition may comprise the following components:

TABLE VC

| Element | Weight % |
|---|---|
| NaCl | 51.5 |
| KCl | 36.0 |
| $CaCl_2.2H_2O$ | 3.5 |
| $MgCl_2.6H_2O$ | 4.0 |
| $CaSO_4.2H_2O$ | 2.0 |
| $K_2SO_4$ | 3.0 |
| Total | 100.0 |

In a fourth preferred embodiment of this group of compositions, which is adapted for use in food products which already contain a high, intrinsic sodium content approaching a targeted level, the composition may comprise about 75 weight percent KCl, about 7 weight percent calcium chloride (e.g., $CaCl_2.2H_2O$), about 8 weight percent magnesium chloride (e.g., $MgCl_2.6H_2O$), about 4 weight percent calcium sulfate (e.g., $CaSO_4.2H_2O$) and about 6 weight percent potassium sulfate (e.g., $K_2SO_4$). This five component form of the composition allows the application of the salt flavor enhancing composition to food products that already contain sodium concentrations approaching formulation sodium targets. For example, in this preferred embodiment, the composition may comprise the following components:

TABLE VD

| Element | Weight % |
|---|---|
| KCl | 75 |
| $CaCl_2.2H_2O$ | 7 |
| $MgCl_2.6H_2O$ | 8 |
| $CaSO_4.2H_2O$ | 4 |
| $K_2SO_4$ | 6 |
| Total | 100 |

A method for preparing a food product using the composition described in Table VD may comprise the following steps. First, an initial sodium ion concentration in a food product may be measured. Second, a quantity of the composition described in Table VD may be added to the food product, such that the food product comprises ion concentrations in a range of about 11 to about 258 millimoles per liter of potassium ions, in a range of about 76 to about 426 millimoles per liter of chloride ions, in a range of about 0.23 to about 14 millimoles per liter of magnesium ions, in a range of about 0.85 to about 25 millimoles per liter of calcium ions, and in a range of about 0.78 to about 27 millimoles per liter of sulfate ions. Third, a source of sodium ions may be added to the food product, such that the food product comprises a final sodium ion concentration in a range of about 64 to about 144 millimoles per liter of sodium ions.

The salt flavor enhancing composition may be manufactured in about 227 to about 452 kg. batches by mixing the sulfate-containing and chloride-containing salts with the NaCl under conditions of constant agitation, such as may be provided by a Patterson Kelly Blender with an intensifier bar. Such blenders are commercially available from Patterson-Kelly Co., East Stroudsburg, Pa., U.S.A. However, other commercially available, dry material blenders or mixing means for providing constant mechanical agitation are also suitable. Finally, the KCl is added to the mixture of NaCl and sulfate-containing and chloride-containing salts. The mixture of components may be agitated for an additional period of time, e.g., about 10 minutes, to ensure homogeneity. The ingredients then may mixed in any order to facilitate blending. Although the basic composition may contain three to six elements, it may not be desirable to use the composition in such a basic form in all food products. For example, anticaking agents may also be added to the formulation.

The invention employs specific combinations of sulfate-containing and chloride-containing salts that provide specific ratios of sodium, potassium, chloride, sulfate, calcium, and magnesium ions that reduce or eliminate the bitterness and metallic aftertaste imparted by potassium and serve to achieve an increased, balanced salt taste from the sodium and potassium chloride contained in the mixture. The sodium, potassium, chloride, sulfate, calcium and magnesium ions may be added as inorganic or organic salts or be supplied by components of the food product, i.e., flavors or other ingredients containing these ions, or both.

While not wishing to be bound by a theory, it is believed that the advantageous results of the invention are obtained because the salts provide dissociable forms of sulfate and, where applicable, magnesium, that ameliorate potassium-induced bitterness, and in the case of sulfate anions, prolong the sensation of the salt flavor. The sulfate ion is a frequent component of salt enhancing compositions and is believed to play an important role in salt enhancement. The chloride salts contribute additional chloride anions to the system, which also potentiate salt flavor. The combination of salts in this invention is believed to provide a synergistic effect that enhance salt flavor and reduce unpleasant aftertastes associated with low sodium salt substitutes potassium chloride.

EXAMPLES

The invention may be better understood by consideration of the following examples, which are intended to be purely exemplary of the use of the invention. Further, the unexpected results described above and revealed by the following examples are exemplary of the performance of embodiments of the compositions of the present invention.

Example One

In a first example, four salt flavor enhancing compositions were prepared, corresponding to the compositions described in Tables ID, IID, IIID, and IVD. Experimental samples were prepared by adding the four salt flavor enhancing compositions independently to a chicken broth, Table VI, containing about 360 mg sodium per 240 g serving, such that the final salt concentrations in the chicken broth were substantially the same ratios as in the salt enhancing compositions described in Tables IC, IIC, IIIC, and IVC. The control samples were prepared according to Table VI, except that the salt enhancing compositions were replaced by 0.273 percent potassium chloride by weight. The total NaCl content about 0.378 percent by weight represents the sum of the added NaCl, i.e., about 0.32 percent by weight, and NaCl derived from the chicken flavors and chicken stock, i.e., about 0.058 percent by weight. The chicken broth samples were processed at about 2500° F. for about 30 minutes, refrigerated and stored for about two weeks, reheated to about 160° F., and served to a panel of taste testers.

TABLE VI

| Ingredient | Weight % |
|---|---|
| Chicken stock | 5.00 |
| Spice and flavor | 0.30 |
| Sugar | 0.30 |
| Sodium Chloride | 0.32 |
| Salt enhancer | 0.30 |
| Water | 93.78 |
| Total | 100.00 |

The experimental broths were subject to sensory analysis by ten panelists and rated against a control broth containing about 360 mg sodium per serving and potassium chloride. The amount of potassium chloride in the control broth was about equal to the amount of potassium chloride in the samples containing the salt flavor enhancing compositions.

The salt flavor enhancing compositions described in Tables IC and IIC were rated as tasting saltier than the sodium and potassium chloride containing control, and about 67 percent of the panelists preferred the salt flavor enhancing compositions to the sodium chloride and potassium chloride containing control. The salt enhancing compositions in Table IIIC and IVC were rated as slightly saltier tasting than the sodium and potassium chloride containing control, and were preferred to the control by about 60 percent and about 71 percent of the panelists, respectively. These results demonstrates that the salt flavor enhancing compositions may function as salt substitutes in the formulation of low-sodium food products.

Example Two

In a second example, two salt flavor enhancing compositions were prepared, corresponding to the compositions described in Tables ID and IID. Experimental samples were prepared by adding the salt flavor enhancing compositions independently, about 0.54 and about 0.64 percent by weight for the compositions of Table ID and IID, respectively, to a condensed cream of mushroom soup, Table V, containing about 360 mg sodium per 240 g serving, such that the final salt concentrations in the soup were substantially the same ratios as in the salt flavor enhancing compositions described in Tables IC and IIC. The control samples were prepared according to Table VII, except the salt flavor enhancing compositions were replaced by about 0.6 percent potassium chloride by weight. Minor variations in the solid weight of the soup components were compensated for by adjusting the amount of water. The total NaCl content, about 0.756 percent by weight represents the sum of the added NaCl, about 0.70 percent by weight, and NaCl derived from flavors, about 0.056 percent by weight. The condensed cream of mushroom soup samples were processed at about 250° F. for about 55 minutes, refrigerated and stored for about two weeks, reheated to about 160° F., and served to a panel of taste testers.

TABLE VII

| Ingredient | Weight % |
| --- | --- |
| Mushrooms | 12.00 |
| Spice and flavor | 0.60 |
| Sugar | 0.70 |
| Thickeners | 7.70 |
| Oil | 1.50 |
| Cream | 1.20 |
| Salt enhancer | 0.54–0.64 |
| Sodium chloride | 0.70 |
| Water | 75.00 |
| Total | 100.00 |

The experimental soups were subject to sensory analysis by six panelists and rated against a control soup containing about 360 mg sodium per serving and potassium chloride. The control potassium chloride concentration was optimized to deliver the best salt taste possible prior to the preparation of the sensory evaluation samples. The amount of potassium chloride in the control soup, about 0.6 percent by weight, was about equal to the amount of potassium chloride in the samples containing the salt flavor enhancing compositions. Even when the sodium and potassium chloride control sample was optimized for salt taste, the samples containing the salt flavor enhancing mixtures described in Tables IC and IIC were described as saltier with better overall flavor balance than the control.

Example Three

In a third example, the salt flavor enhancing composition described in Tables IVD was added to a ready-to-serve, about 360 mg sodium per 240 g serving New England clam chowder soup, such that the final salt concentrations in the soup were substantially the same ratio as in the salt flavor enhancing composition described in Table IVC. The control sample was prepared according to Table VIII, except the salt flavor enhancing composition was replaced by about 0.25 percent potassium chloride by weight. The total NaCl content, about 0.378 percent by weight, represents the sum of the added NaCl, about 0.255 percent by weight, and NaCl derived from the ingredients, about 0.123 percent by weight. The ready-to-serve New England clam chowder soup samples were processed at about 250° F. for about 55 minutes, refrigerated and stored for about two weeks, reheated to about 160° F., and served to a panel of taste testers.

TABLE VIII

| Ingredient | Weight % |
| --- | --- |
| Vegetables | 30.00 |
| Clam meat | 11.00 |
| Spice and flavor | 1.50 |
| Thickeners | 3.40 |
| Oil | 0.70 |
| Sodium chloride | 0.26 |
| Salt enhancer | 0.30 |
| Water | 52.84 |
| Total | 100.00 |

The experimental soup was subject to sensory analysis by four panelists and rated against a control soup containing about 360 mg sodium per serving and potassium chloride. The control potassium chloride concentration was optimized to deliver the best salt taste possible prior to the preparation of the sensory evaluation samples. The amount of potassium chloride in the control was about equal to the amount of potassium chloride in the samples containing the salt flavor enhancing compositions. Even when the sodium and potassium chloride control sample was optimized for salt taste, the sample containing the salt flavor enhancing mixture described in Table IVC was described as saltier with a better flavor balance than the control.

Example Four

In a fourth example, the salt flavor enhancing composition described in Table VD was added to a condensed tomato soup containing about 480 mg sodium per serving such that the final salt concentrations in the soup were the same ratios as in the salt enhancing composition described in Table VC. The control sample was prepared according to Table IX, except the salt enhancing composition was omitted. The total NaCl content, about 1.0 percent by weight, represents the sum of the added NaCl, i.e., about 0.95 percent by weight, and NaCl derived from the ingredients, i.e., about 0.06 percent by weight. The condensed tomato soup samples were processed at about 240° F. for about 25 minutes, refrigerated and stored for about two weeks, ted to about 160° F., and served to a panel of taste testers.

TABLE IX

| Ingredient | Weight % |
| --- | --- |
| Tomato paste | 14.50 |
| Spice and flavor | 0.96 |
| Corn syrup | 6.22 |
| Thickeners | 6.30 |
| Sodium chloride | 1.00 |
| Salt enhancer | 0.90 |
| Water | 70.12 |
| Total | 100.00 |

The experimental soup was subject to sensory analysis by four panelists and rated against a control soup containing about 480 mg sodium per serving. Potassium chloride was not incorporated in the control at any level that significantly enhanced the perception of salt, because the potassium chloride imparted bitter and metallic flavors to the soup. The sample containing the salt enhancing mixture described in Table VC was described as saltier than the control. The composition produced a palatable soup containing potassium chloride and did not impart the bitter and metallic off-flavors normally associated with potassium chloride.

Example Five

In a fifth example, the salt flavor enhancing composition described in Tables ID was added to a tomato juice containing about 360 mg sodium per serving such that the final salt concentrations in the juice were substantially the same ratios in the salt enhancing composition described in Tables IC. The control sample was prepared according to Table IX, except that the salt flavor enhancing composition was omitted. The total NaCl content, about 0.378 percent by weight, represents the sum of the added NaCl, i.e., about 0.335 percent by weight, and NaCl derived from the ingredients, i.e., about 0.043 percent by weight. The tomato juice samples were processed at about 250° F. for about 45 seconds, refrigerated and stored for about two weeks, allowed to warm to about 50° F., and served to a panel of taste testers.

TABLE X

| Ingredient | Weight % |
| --- | --- |
| Tomato paste | 14.70 |
| Spice and flavor | 0.02 |
| Sodium chloride | 0.34 |
| Salt enhancer | 0.30 |
| Water | 84.64 |
| Total | 100.00 |

The experimental juice was subject to sensory analysis by four panelists and rated against a control juice containing about 360 mg sodium per serving. The sample containing the salt flavor enhancing composition described in Table IIC was described as saltier than the control and did not impart the bitter and metallic off-flavors frequently associated with potassium chloride.

Other embodiments of the invention will be apparent to those skilled in the art from a consideration of this specification or practice of the invention disclosed herein. It is intended, however, that the detailed description in the specification and these examples be considered as exemplary only. Although the present invention has been described in connection with preferred embodiments, the invention is not limited thereto. For example, the composition may also consist of salts in different hydration states, or salts capable of delivering similar molar ratios of sodium, potassium, chloride, calcium, magnesium, and sulfate ions, as those realized through the examples describing embodiments of this invention. It will be understood by those of ordinary skill in the art that variations and modifications may be made within the scope of this invention as defined by the following claims.

We claim:

1. A salt flavor enhancing composition consisting essentially of a first component selected from the group consisting of potassium chloride and a combination of sodium chloride and potassium chloride in a range of about 74 to about 99 percent by weight and a second component selected from the group consisting of at least one sulfate-containing salt and a combination of at least one sulfate-containing salt and at least one chloride-containing salt, wherein said at least one sulfate-containing salt or said combination is in a range of about 1 to about 26 percent by weight and wherein said at least one sulfate-containing salt is selected from the group consisting of potassium sulfate, calcium sulfate, and combinations thereof.

2. The composition of claim 1, wherein said at least one chloride-containing salt is selected from the group consisting of calcium chloride, magnesium chloride, and combinations thereof.

3. The composition of claim 2, wherein said composition comprises a range of about 87 to about 97 percent by weight of sodium chloride and potassium chloride; a range of about 2 to about 8 percent magnesium chloride by weight; and a range of about 1 to about 5 percent potassium sulfate by weight.

4. The composition of claim 3, wherein said composition comprises sodium chloride in a range of about 37 to about 81 percent by weight; potassium chloride in a range of about 16 to about 50 percent by weight; hydrated magnesium chloride in a range of about 2 to about 8 by weight; and potassium sulfate in a range of about 1 to about 5 percent by weight.

5. A food product comprising the composition of claim 3.

6. The food product of claim 5, wherein the food product comprises ion concentrations in a range of about 64 to about 144 millimoles per liter of sodium ions; about 10 to about 165 millimoles per liter of potassium ions; about 74 to about 314 millimoles per liter of chloride ions; about 0.4 to about 9.0 mM per liter of magnesium ions; and about 0.2 to about 6.3 millimoles per liter of sulfate ions.

7. The food product of claim 5, wherein, in the food product, the ratio of sodium ions to chloride ions is from about 0.2:1 to about 2:1; the ratio of sodium ions to potassium ions is from about 0.4:1 to about 14.4:1; the ratio of sodium ions to magnesium ions is from about 7.1:1 to about 360:1; and the ratio of sodium ions to sulfate ions is from about 10.2:1 to about 720:1.

8. The composition of claim 3, wherein said composition comprises a range of about 91 to about 96 percent by weight of sodium chloride and potassium chloride; a range of about 3 to about 6 percent magnesium chloride by weight; and a range of about 1 to about 3 percent potassium sulfate by weight.

9. The composition of claim 8, wherein said composition comprises sodium chloride in a range of about 46 to about 61 percent by weight; potassium chloride in a range of about 35 to about 45 percent by weight; hydrated magnesium chloride in a range of about 3 to about 6 by weight; and potassium sulfate in a range of about 1 to about 3 percent by weight.

10. A food product comprising the composition of claim 8.

11. The food product of claim 10, wherein the food product comprises ion concentrations in a range of about 64 to about 144 millimoles per liter of sodium ions; about 29 to about 117 millimoles per liter of potassium ions; about 95 to about 265 millimoles per liter of chloride ions; about 0.9 to about 5.4 millimoles per liter of magnesium ions; and about 0.6 to about 3 millimoles per liter of sulfate ions.

12. The food product of claim 10, wherein, in the food product, the ratio of sodium ions to chloride ions is from about 0.2:1 to about 1.5:1; the ratio of sodium ions to potassium ions is from about 0.6:1 to about 5:1; the ratio of sodium ions to magnesium ions is from about 11.9:1 to about 160:1; and the ratio of sodium ions to sulfate ions is from about 21.3:1 to about 240:1.

13. The composition of claim 8 adapted for topical use on a food product, wherein said composition comprises about 93.5 percent by weight of sodium chloride and potassium chloride; about 4.3 percent hydrated magnesium chloride by weight; and about 2.2 percent potassium sulfate by weight.

14. The composition of claim 13, wherein said composition comprises about 54.5 percent sodium chloride by weight; about 39 percent potassium chloride by weight; about 4.3 percent hydrated magnesium chloride by weight; and about 2.2 percent potassium sulfate by weight.

15. The composition of claim 2, wherein said composition comprises a range of about 74 to about 95 percent by weight of sodium chloride and potassium chloride; a range of about 1 to about 4 percent calcium chloride by weight; a range of about 1 to about 8 percent magnesium chloride by weight; a range of about 2 to about 8 percent calcium sulfate by weight; and a range of about 1 to about 6 percent potassium sulfate by weight.

16. The composition of claim 15, wherein said composition comprises sodium chloride in a range of about 24 to about 79 percent by weight; potassium chloride in a range of about 16 to about 50 percent by weight; hydrated calcium chloride in a range of about 1 to about 4 percent by weight; hydrated magnesium chloride in a range of about 1 to about 8 percent by weight; hydrated calcium sulfate in a range of about 2 to about 8 percent by weight; and potassium sulfate in a range of about 1 to about 6 percent by weight.

17. A food product comprising the composition of claim 15.

18. The food product of claim 17, wherein the food product comprises ion concentrations in a range of about 64 to about 144 millimoles per liter of sodium ions; about 11 to about 258 millimoles per liter of potassium ions; about 76 to about 426 millimoles per liter of chloride ions; about 0.23 to about 14 millimoles per liter of magnesium ions; about 0.85 to about 25 millimoles per liter of calcium ions; and about 0.78 to about 28 millimoles per liter of sulfate ions.

19. The food product of claim 17, wherein, in the food product, the ratio of sodium ions to chloride ions is from about 0.2:1 to about 1.9:1; the ratio of sodium ions to potassium ions is from about 0.3:1 to about 13.1:1; the ratio of sodium ions to magnesium ions is from about 5.6:1 to about 626:1; the ratio of sodium ions to calcium ions is from about 2.6:1 to about 169:1; and the ratio of sodium ions to sulfate ions is from about 2.4:1 to about 185:1.

20. The composition of claim 15, wherein said composition comprises a range of about 81 to about 92 percent by weight of sodium chloride and potassium chloride; a range of about 1 to about 3 percent calcium chloride by weight; a range of about 3 to about 6 percent magnesium chloride by weight; a range of about 3 to about 6 percent calcium sulfate by weight; and a range of about 1 to about 4 percent potassium sulfate by weight.

21. The composition of claim 20, wherein said composition comprises sodium chloride in a range of about 41 to about 62 percent by weight; potassium chloride in a range of about 30 to about 40 percent by weight; hydrated calcium chloride in a range of about 1 to about 3 percent by weight; hydrated magnesium chloride in a range of about 3 to about 6 percent by weight; hydrated calcium sulfate in a range of about 3 to about 6 percent by weight; and potassium sulfate in a range of about 1 to about 4 percent by weight.

22. A food product comprising the composition of claim 21.

23. The food product of claim 22, wherein the food product comprises ion concentrations in a range of about 64 to about 144 millimoles per liter of sodium ions; about 25 to about 199 millimoles per liter of potassium ions; about 91 to about 275 millimoles per liter of chloride ions; about 0.8 to about 6 millimoles per liter of magnesium ions; about 1.4 to about 11 millimoles per liter of calcium ions; and about 1.3 to about 11.4 millimoles per liter of sulfate ions.

24. The food product of claim 22, wherein, in the food product, the ratio of sodium ions to chloride ions is from about 0.2:1 to about 1.6:1; the ratio of sodium ions to potassium ions is from about 0.3:1 to about 5.8:1; the ratio of sodium ions to magnesium ions is from about 10.7:1 to about 180:1; the ratio of sodium ions to calcium ions is from about 5.8:1 to about 102.9:1; and the ratio of sodium ions to sulfate ions is from about 5.6:1 to about 110.8:1.

25. The composition of claim 15 adapted for topical use on a food product, wherein said composition comprises about 87.5 percent by weight of sodium chloride and potassium chloride; about 3.5 percent calcium chloride by weight; about 4 percent magnesium chloride by weight; about 2 percent calcium sulfate by weight; and about 3 percent potassium sulfate by weight.

26. The composition of claim 25, wherein said composition comprises about 51.5 percent sodium chloride by weight; about 36 percent potassium chloride by weight; about 3.5 percent calcium chloride by weight; about 4 percent magnesium chloride by weight; about 2 percent calcium sulfate by weight; and about 3 percent potassium sulfate by weight.

27. The composition of claim 1, wherein said composition comprises a range of about 96 to about 99 percent by weight of sodium chloride and potassium chloride and a range of about 1 to about 4 percent potassium sulfate by weight.

28. The composition of claim 27, wherein said composition comprises sodium chloride in a range of about 45 to about 83 percent by weight; potassium chloride in a range of about 16 to about 51 percent by weight; and potassium sulfate in a range of about 1 to about 4 percent by weight.

29. A food product comprising the composition of claim 27.

30. The food product of claim 29, wherein said food product comprises ion concentrations in a range of about 64 to about 144 millimoles per liter of sodium ions; about 10 to about 136 millimoles per liter of potassium ions; about 74 to about 272 millimoles per liter of chloride ions; and about 0.2 to about 4 millimoles per liter of sulfate ions.

31. The food product of claim 29, wherein, in said food product, the ratio of sodium ions to chloride ions is from about 0.2:1 to about 1.9:1; the ratio of sodium ions to potassium ions is from about 0.5:1 to about 14.4:1; and the ratio of sodium ions to sulfate ions is from about 16:1 to about 720:1.

32. The composition of claim 27, wherein said composition comprises a range of about 97 to about 99 percent by weight of sodium chloride and potassium chloride and a range of about 1 to about 3 percent potassium sulfate by weight.

33. The composition of claim 32, wherein said composition comprises sodium chloride in a range of about 52 to about 64 percent by weight; potassium chloride in a range of about 35 to about 45 percent by weight; and potassium sulfate in a range of about 1 to about 3 percent by weight.

34. A food product comprising the composition of claim 32.

35. The food product of claim 34, wherein the food product comprises ion concentrations in a range of about 64 to about 144 millimoles per liter of sodium ions; about 28 to about 103 millimoles per liter of potassium ions; about 92 to about 242 millimoles per liter of chloride ions; and about 0.3 to about 3 millimoles per liter of sulfate ions.

36. The composition of claim 32, wherein the ratio of sodium ions to chloride ions is from about 0.3:1 to about 1.6:1; the ratio of sodium ions to potassium ions is from about 0.6:1 to about 5.1:1; and the ratio of sodium ions to sulfate ions is from about 21.3:1 to about 480:1.

37. The composition of claim 32 adapted for topical use on a food product, wherein said composition comprises about 97 percent by weight of sodium chloride and potassium chloride and about 3 percent potassium sulfate by weight.

38. The composition of claim 32, wherein said composition comprises about 57.7 percent sodium chloride by weight; about 40 percent potassium chloride by weight; and about 2.3 percent potassium sulfate by weight.

39. The composition of claim 1, wherein said composition comprises a range of about 94 to about 99 percent by weight of sodium chloride and potassium chloride and a range of about 1 to about 6 percent calcium sulfate by weight.

40. The composition of claim 39, wherein said composition comprises sodium chloride in a range of about 44 to about 83 percent by weight; potassium chloride in a range of about 16 to about 50 percent by weight; and hydrated calcium sulfate in a range of about 1 to about 6 percent by weight.

41. The composition of claim 40, wherein said composition comprises sodium chloride in a range of about 51 to about 63 percent by weight; potassium chloride in a range of about 35 to about 45 percent by weight; hydrated calcium sulfate in a range of about 2 to about 4 percent by weight.

42. A food product comprising the composition of claim 39.

43. The food product of claim 42, wherein the food product comprises ion concentrations in a range of about 64 to about 144 millimoles per liter of sodium ions; about 9 to about 128 millimoles per liter of potassium ions; about 74 to about 272 millimoles per liter of chloride ions; about 0.2 to about 6.4 millimoles per liter of calcium ions; and about 0.2 to about 6.4 millimoles per liter of sulfate ions.

44. The food product of claim 42, wherein, in the food product, the ratio of sodium ions to chloride ions is from about 0.2:1 to about 2:1; the ratio of sodium ions to potassium ions is from about 0.5:1 to about 16:1; the ratio of sodium ions to calcium ions is from about 10:1 to about 720:1; and the ratio of sodium ions to sulfate ions is from about 10:1 to about 720:1.

45. The composition of claim 39, wherein said composition comprises a range of about 96 to about 98 percent by weight of a combination of sodium chloride and potassium chloride and a range of about 2 to about 4 percent calcium sulfate by weight.

46. A food product comprising the composition of claim 45.

47. The food product of claim 46, wherein the food product comprises ion concentrations in a range of about 64 to about 144 millimoles per liter of sodium ions; about 28 to about 100 millimoles per liter of potassium ions; about 92 to about 244 millimoles per liter of chloride ions; about 0.6 to about 4 millimoles per liter of calcium ions; and about 0.6 to about 4 millimoles per liter of sulfate ions.

48. The food product of claim 46, wherein, in the off food product, the ratio of sodium ions to chloride ions is from about 0.3:1 to about 1.6:1; the ratio of sodium ions to potassium ions is from about 0.6:1 to about 5.1:1; the ratio of sodium ions to calcium ions is from about 16:1 to about 240:1; and the ratio of sodium ions to sulfate ions is from about 16:1 to about 240:1.

49. The composition of claim 45 adapted for topical use on a food product, wherein said composition comprises about 96.5 percent by weight of said combination of sodium chloride and potassium chloride and about 3.5 percent hydrated calcium sulfate by weight.

50. The composition of claim 49, wherein said composition comprises about 56 percent sodium chloride by weight; about 40.5 percent potassium chloride by weight; and about 3.5 percent hydrated calcium sulfate by weight.

51. The composition of claim 1, wherein said composition comprises a range of about 90 to about 98 percent by weight of sodium chloride and potassium chloride; a range of about 1 to about 5 percent calcium sulfate by weight; and a range of about 1 to about 5 percent potassium sulfate by weight.

52. The composition of claim 51, wherein said composition comprises sodium chloride in a range of about 40 to about 82 percent by weight; potassium chloride in a range of about 16 to about 50 percent by weight; hydrated calcium sulfate in a range of about 1 to about 5 percent by weight; and potassium sulfate in a range of about 1 to about 5 percent by weight.

53. A food product comprising the composition of claim 51.

54. The food product of claim 53, wherein the food product comprises ion concentrations in a range of about 64 to about 144 millimoles per liter of sodium ions; about 10 to about 153 millimoles per liter of potassium ions; about 74 to about 285 millimoles per liter of chloride ions; about 0.2 to about 6 millimoles per liter of calcium ions; and about 0.5 to about 12 millimoles per liter of sulfate ions.

55. The food product of claim 53, wherein, in the food product, the ratio of sodium ions to chloride ions is from about 0.2: to about 2:1; the ratio of sodium ions to potassium ions is from about 0.4:1 to about 14.4:1; the ratio of sodium ions to calcium ions is from about 10.77:1 to about 720:1; and the ratio of sodium ions to sulfate ions is from about 5.3:1 to about 288:1.

56. The composition of claim 51, wherein said composition comprises a range of about 94 to about 98 percent by weight of sodium chloride and potassium chloride; a range of about 1 to about 3 percent calcium sulfate by weight; and a range of about 1 to about 3 percent potassium sulfate by weight.

57. The composition of claim 56, wherein said composition comprises sodium chloride in a range of about 49 to about 63 percent by weight; potassium chloride in a range of about 35 to about 45 percent by weight; hydrated calcium sulfate in a range of about 1 to about 3 percent by weight; and potassium sulfate in a range of about 1 to about 3 percent by weight.

58. A food product comprising the composition of claim 56.

59. The food product of claim 58, wherein the food product comprises ion concentrations in a range of about 64 to about 144 millimoles per liter of sodium ions; about 28 to about 110 millimoles per liter of potassium ions; about 92 to about 248 millimoles per liter of chloride ions; about 0.3 to about 2.9 millimoles per liter of calcium ions; and about 0.6 to about 6 millimoles per liter of sulfate ions.

60. The food product of claim 58, wherein, in the food product, the ratio of sodium ions to chloride ions is from about 0.3:1 to about 1.6:1; the ratio of sodium ions to potassium ions is from about 0.6:1 to about 5.1:1; the ratio of sodium ions to calcium ions is from about 22.1:1 to about 480:1; and the ratio of sodium ions to sulfate ions is from about 10.7:1 to about 240:1.

61. The composition of claim 56 adapted for topical use on a food product, wherein said composition comprises about 96 percent by weight of sodium chloride and potassium chloride; about 2 percent calcium sulfate by weight; and about 2 percent potassium sulfate by weight.

62. The composition of claim 61, wherein said composition comprises about 58 percent sodium chloride by weight; about 38 percent potassium chloride by weight; about 2 percent hydrated calcium sulfate by weight; and about 2 percent potassium sulfate by weight.

63. A salt flavor enhancing composition, adapted for use on food products having high intrinsic sodium content, consisting essentially of potassium chloride in a range of about 75 to about 95 percent by weight and at least one salt selected from the group consisting of at least one sulfate-containing salt and a combination of at least one sulfate-containing salt and at least one chloride-containing salt, wherein said at least one sulfate-containing salt or said combination is in a range of about 5 to about 25 percent by weight and wherein said at least one sulfate-containing salt is selected from the group consisting of potassium sulfate, calcium sulfate, and combinations thereof.

64. The composition of claim 63, wherein said composition is about 94.6 percent potassium chloride by weight and about 5.4 percent potassium sulfate by weight.

65. The composition of claim 63, wherein said at least one chloride-containing salt is selected from the group consisting of calcium chloride, magnesium chloride, and combinations thereof.

66. The composition of claim 65, wherein said composition is about 86 percent potassium chloride by weight, about 9 percent hydrated magnesium chloride by weight, and about 5 percent potassium sulfate by weight.

67. The composition of claim 65, wherein said composition is about 75 percent potassium chloride by weight, about 7 percent calcium chloride by weight, about 8 percent magnesium chloride by weight, about 4 percent calcium sulfate by weight, and about 6 percent potassium sulfate by weight.

68. The composition of claim 67, wherein said calcium chloride is hydrated calcium chloride.

69. The composition of claim 67, wherein said magnesium chloride is hydrated magnesium chloride.

70. The composition of claim 67, wherein said calcium sulfate is hydrated calcium sulfate.

71. The composition of claim 63, wherein said composition is about 92 percent potassium chloride by weight and about 8 percent calcium sulfate by weight.

72. The composition of claim 63, wherein said composition is about 90 percent potassium chloride by weight, about 5 percent calcium sulfate by weight, and about 5 percent potassium sulfate by weight.

73. The composition of claim 72, wherein said calcium sulfate is hydrated calcium sulfate.

74. A salt flavor enhancing composition consisting of a first component selected from the group consisting of potassium chloride and a combination of sodium chloride and potassium chloride in a range of about 74 to about 99 percent by weight and a second component selected from the group consisting of at least one sulfate-containing salt and combinations of at least one sulfate-containing salt and at least one chloride-containing salt, wherein said at least one sulfate-containing salt or said combination is in a range of about 1 to about 26 percent by weight and wherein said at least one sulfate-containing salt is selected from the group consisting of potassium sulfate, calcium sulfate, and combinations thereof.

75. A salt flavor enhancing composition, adapted for use on food products having high intrinsic sodium content, consisting of potassium chloride in a range of about 75 to about 95 percent by weight and at least one salt selected from the group consisting of at least one sulfate-containing salt and a combination of at least one sulfate-containing salt and at least one chloride-containing salt, wherein said at least one sulfate-containing salt or said combination is in a range of about 5 to about 25 percent by weight and wherein said at least one sulfate-containing salt is selected from the group consisting of potassium sulfate, calcium sulfate, and combinations thereof.

* * * * *

UNITED STATES PATENT AND TRADEMARK OFFICE
CERTIFICATE OF CORRECTION

PATENT NO.    : 6,541,050 B1
DATED         : April 1, 2003
INVENTOR(S)   : Willaim R. Bonorden et al.

It is certified that error appears in the above-identified patent and that said Letters Patent is hereby corrected as shown below:

Title page,
Insert Items -- [63], Continuation of application . 09/200,740, filed on November 30, 1998
[60], Provisional application No. 60/110,168, filed on November 27, 1998 --

Signed and Sealed this

Twenty-eighth Day of September, 2004

JON W. DUDAS
*Director of the United States Patent and Trademark Office*